US012243146B2

(12) United States Patent
Gammon et al.

(10) Patent No.: US 12,243,146 B2
(45) Date of Patent: Mar. 4, 2025

(54) ANIMATED DISPLAY CHARACTERISTIC CONTROL FOR DIGITAL IMAGES

(71) Applicant: Adobe Inc., San Jose, CA (US)

(72) Inventors: Christopher James Gammon, Waunakee, WI (US); Brandon Kroupa, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 289 days.

(21) Appl. No.: 18/064,750

(22) Filed: Dec. 12, 2022

(65) Prior Publication Data

US 2024/0193843 A1 Jun. 13, 2024

(51) Int. Cl.
*G06T 13/80* (2011.01)
*G06F 3/04845* (2022.01)
*G06F 3/04847* (2022.01)
*G06F 3/04883* (2022.01)

(52) U.S. Cl.
CPC .......... *G06T 13/80* (2013.01); *G06F 3/04845* (2013.01); *G06F 3/04847* (2013.01); *G06F 3/04883* (2013.01)

(58) Field of Classification Search
None
See application file for complete search history.

(56) References Cited

U.S. PATENT DOCUMENTS

| 8,686,962 | B2 | 4/2014 | Christie et al. |
| 8,971,617 | B2 | 3/2015 | Ubillos et al. |
| 9,811,933 | B2 | 11/2017 | Kokemohr |
| 2016/0110091 | A1 | 4/2016 | Ji et al. |
| 2016/0284070 | A1 | 9/2016 | Pettigrew et al. |
| 2020/0358963 | A1 | 11/2020 | Manzari et al. |

FOREIGN PATENT DOCUMENTS

| CN | 105183349 A | 1/2015 |
| WO | 2016189296 A1 | 12/2016 |

OTHER PUBLICATIONS

"Fotor", Everimaging [retrieved Oct. 20, 2022]. Retrieved from the Internet <https://www.fotor.com/?utm_source=google_sem&utm_medium=cpc&utm_campaign=US_fotor_brand&utm_content=01_fotor_brand&utm_term=fotor%20photo%20editing&gclid=EAlalQobChMI6lqlkYC>., 2009, 8 Pages.
"Mobile Photo Editing Just Got Better!", BeFunky Inc. [retrieved Oct. 20, 2022]. Retrieved from the Internet <https://www.befunky.com/learn/best-photo-editor/>., 13 Pages.
"Movavi Photo Editor is full-power editing with one-touch simplicity for $19", TNW Deals [retrieved Oct. 20, 2022]. Retrieved from the Internet <https://thenextweb.com/news/movavi-photo-editor-is-full-power-editing-with-one-touch-simplicity-for-19>., Mar. 7, 2019, 6 Pages.
"Snapseed App", Snapseed [retrieved Oct. 20, 2022]. Retrieved from the Internet <https://snapseed.online/>., Jun. 2011, 10 Pages.

*Primary Examiner* — Nicholas R Wilson
(74) *Attorney, Agent, or Firm* — FIG. 1 Patents

(57) ABSTRACT

Animated display characteristic control for digital images is described. In an implementation, a control is animated in a user interface as progressing through a plurality of values of a display characteristic. A digital image is displayed in the user interface as progressing through the plurality of values of the display characteristic as specified by the animating of the control. An input is received via the user interface and a particular value of the plurality of values is detected as indicated by the animating of the control. The digital image is displayed as having the particular value of the display characteristic as set by the input.

20 Claims, 8 Drawing Sheets

ANIMATED DISPLAY CHARACTERISTIC CONTROL FOR DIGITAL IMAGES

BACKGROUND

User interaction has migrated from initial use of desktop computing devices to mobile computing devices, examples of which include mobile phones, tablets, and so forth. One reason is that a mobile configuration increases accessibility of the device in a greater range of usage scenarios. However, the mobile configuration also decreases the ways, in which, a user is able to interact with the device. Consequently, tasks involving significant amounts of user interaction with a computing device, such as digital image editing, are hindered when used as part of a mobile configuration in conventional techniques.

SUMMARY

Animated display characteristic control for digital images is described. In an implementation, a control is animated in a user interface as progressing through a plurality of values of a display characteristic. A digital image is displayed in the user interface as having the display characteristic set as specified by the animating of the control through the plurality of values. An input is received via the user interface (e.g., a tap gesture) and a particular value of the plurality of values is detected as indicated by the animating of the control. The digital image is displayed as having the particular value of the display characteristic as set by the input.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
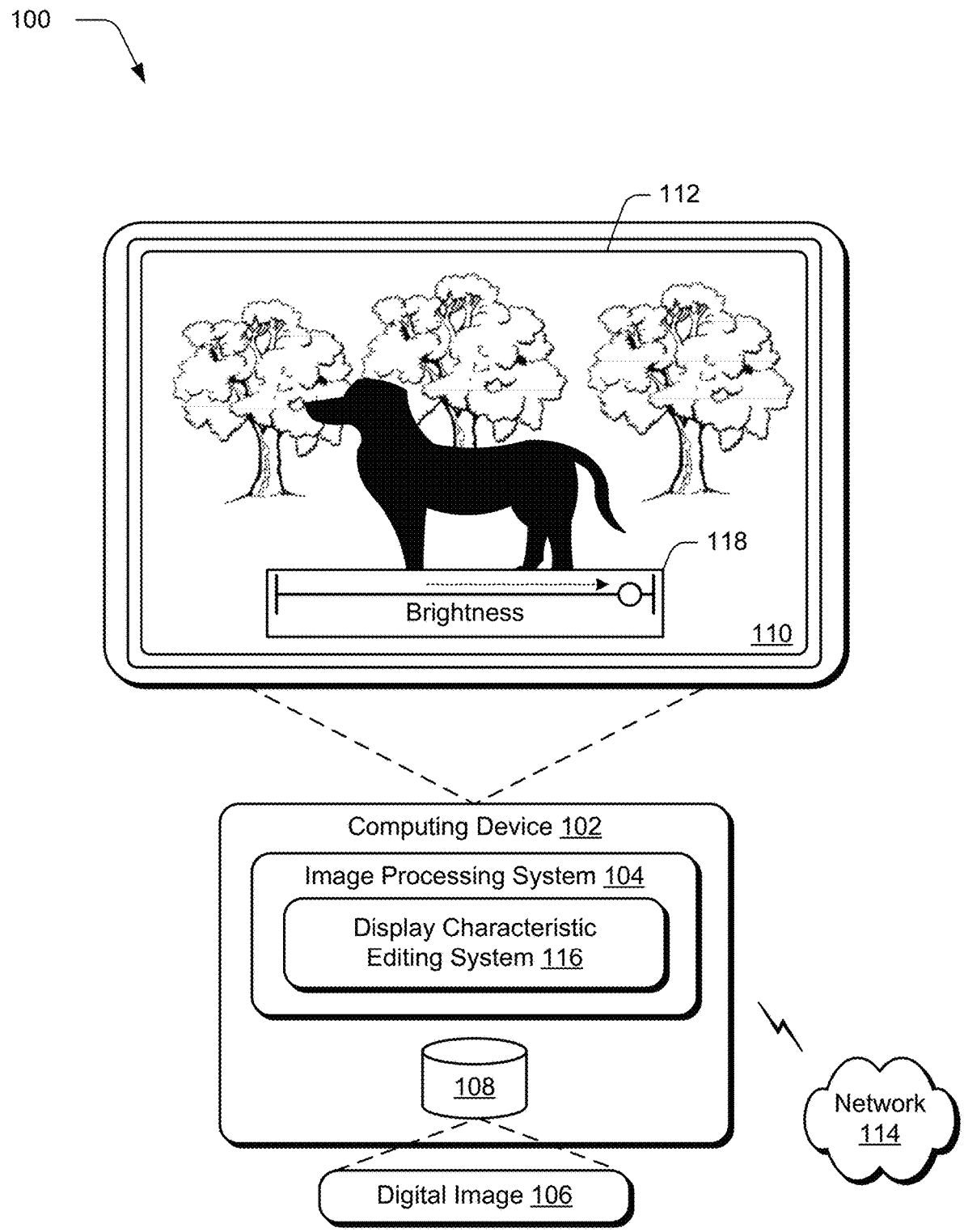
FIG. 1 is an illustration of a digital medium environment in an example implementation that is operable to employ animated display characteristic control techniques for digital images as described herein.

Mobile computing devices support a variety of functionalities. However, access to these functionalities is limited by this configuration, the challenges of which are compounded when confronted with scenarios regarding significant amounts of user interaction. An example of this is digital image editing, which in some usage scenarios involves accessing a multitude of different operations and displaying an effect of those operations on a digital image in a user interface. Thus, it is often challenging, in conventional techniques, to interact with the operations as well as view a result of those operations.

Accordingly, animated display characteristic control techniques are described for digital images. These techniques improve user interaction and device operation by employing animations as part of controlling edits to display characteristics of a digital image. In one example, a digital image is displayed in a user interface. A user input is received to initiate an edit to a display characteristic, e.g., contrast. In response, a display characteristic editing system outputs a control in the user interface. The control is configured to support user interaction, directly, to select a particular value from a plurality of values for the display characteristics, e.g., as a slider, a dial, and so forth.

In this example, the display characteristic editing system animates the control to progress through the plurality of values, e.g., as a "back-and-forth" between values of zero to one hundred for contrast. An effect of these values on the display characteristics, as applied to the digital image, is also output in the user interface in real time during this animation. As a result, a user is provided with an ability to readily view implementation of the different values for the display characteristic on the digital image without manually interacting with the computing device. This increases an amount of a display area of the user interface that is usable and consequently viewable by a user in order to view these effects. As such, this provides significant advantages when employed by computing devices having mobile-form factors by increasing a user's ability to view details in the digital image that are affected by the changes.

When a desired effect of the display characteristic is viewed, another user input is received (e.g., via a "tap" gesture) which causes that value for the display characteristic to be set for the digital image. This process is configurable to iterate through a variety of display characteristics in sequence, thereby supporting efficient user interaction and device operation in editing of the digital image using device configurations that otherwise would be challenged in performing these techniques, i.e., by mobile phones and tablets.

These techniques also support a variety of additional usage scenarios. As described above, digital image editing often involves access to a multitude of operations. Consequently, use of conventional techniques to learn the use and effect of these operations through interaction with a computing device by casual and even professional users is daunting. Accordingly, the animated display characteristic control techniques described herein are also configurable to aid in the training and use of these operations.

In a training scenario, for instance, the display characteristic editing system also receives a digital image. The digital image includes a raw format of the image as well as display characteristics that are adjusted to edit the digital image. The digital image is displayed in the user interface based on this raw format, i.e., as unedited. The display characteristic editing system then progresses through the display characteristics that are set and animates values for the display characteristics as described above. A user input is also received to set a value as also described above, e.g., via a "tap" gesture.

In this example, however, the display characteristic editing system compares a value of the display characteristic corresponding to the user input to a target value set for that digital image as received by the system. This comparison is then used as a basis to select an indication from a plurality of indications symbolic of this closeness, e.g., "perfect," "close," "missed," etc. This indication is output in the user interface which provides instantaneous feedback to a user as to the accuracy of the selection.

This process continues through the display characteristics and is usable to calculate a "final score" indicative of overall accuracy of the user selections of the values for the display characteristics. In this way, user training in use of the display characteristics by the computing device is "gamified" and supports improved user interaction and operation of the device. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment in an example implementation that is operable to employ animated display characteristic control techniques for digital images as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 8.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the digital image 106 is illustrated as a display characteristic editing system 116. The display characteristic editing system 116 supports changes to display characteristics, examples of which include brightness, contrast, saturation, sharpness, shadows, tint, and so forth. Thus, display characteristics describe changes that are used to adjust color values of pixels within the digital image 106 to achieve a desired visual effect. The display characteristics, for instance, are configurable to specify respective amounts brightness, contrast, saturation, sharpness, shadows, tint, and so forth to be applied to respective pixels of the digital image 106 between a minimum value and a maximum value.

A control 118 is then usable to set the respective amounts between those values. In the illustrated example, the control 118 is configured as a slider having a portion indicating a current value that is directly user selectable (e.g., via a gesture) to adjust the values, a result of which is applied to a display of the digital image 106 in the user interface 110. As previously described, conventional techniques used to set display characteristics are challenged by a multitude of display characteristics available as well as the manual interaction involving in interacting with the control, which hinder visibility of the user interface 110.

In the techniques described herein, however, the display characteristic editing system 116 is configured to animate the control 118. This is used to change values of the display characteristic, an effect of which is output in real time in the user interface 110 as a corresponding change made to the digital image 106. As a result, a user interacting with the computing device 102 is provided with an ability to both view values of the display characteristic as well as an effect of those values on the digital image 106 without covering a portion of the display device 112. This increases an effective viewable area of the user interface 110 and as such supports increased functionality, e.g., to view the digital image 106 in greater detail and thus an effect of the change in value on the display characteristic.

A variety of functionalities are made possible through this technique. In a first example, this is usable to set a display characteristic as part of iterating through a plurality of display characteristics efficiently to edit the digital image. In a second example, these techniques are gamified to support user training in operation of the image processing system 104. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Automated Display Characteristic Control

Figure 2:
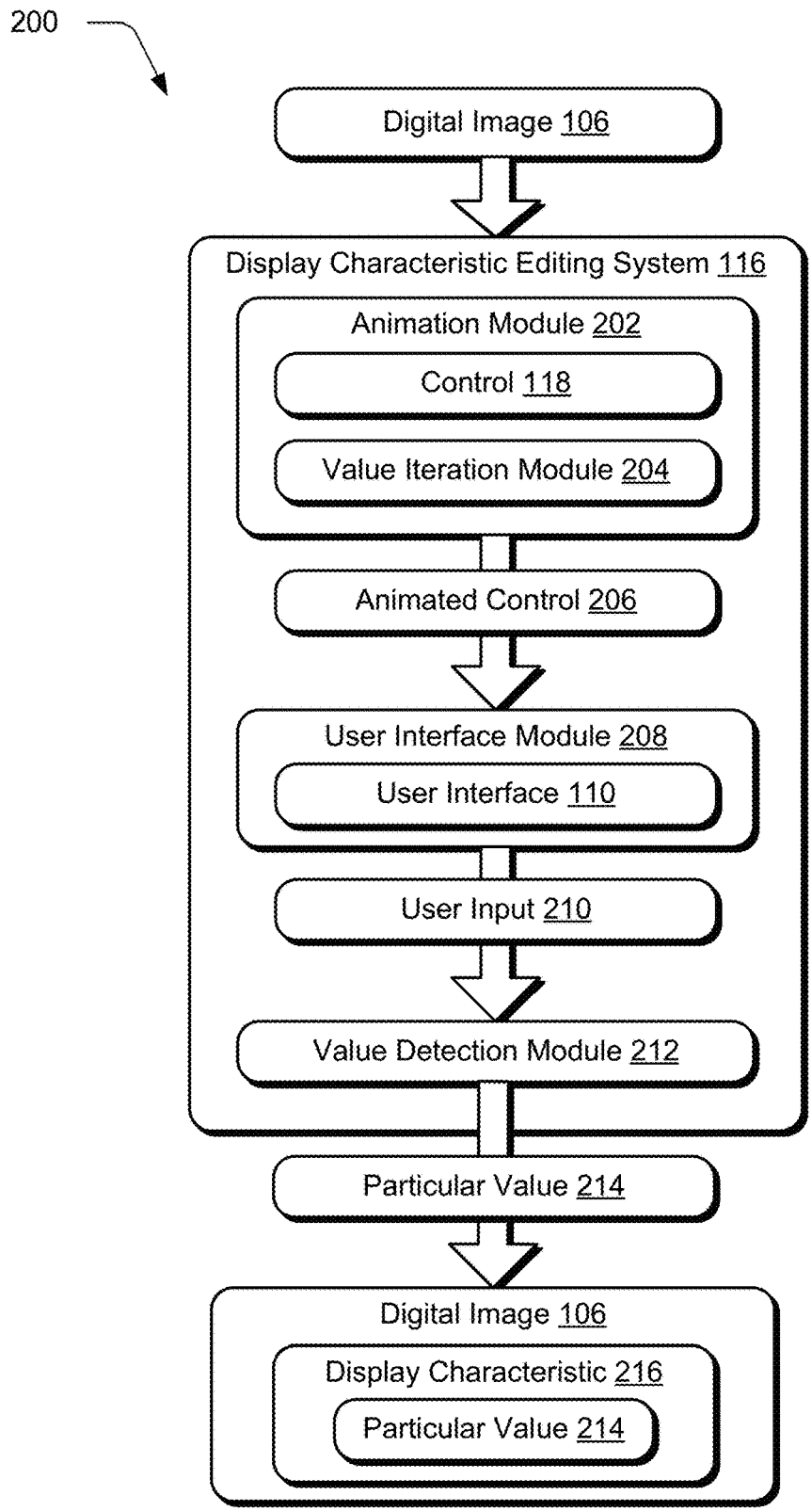
FIG. 2 depicts a system in an example implementation showing operation of a display characteristic editing system of FIG. 1 in greater detail as animating a control to set a value of a display characteristic.
Figure 3:
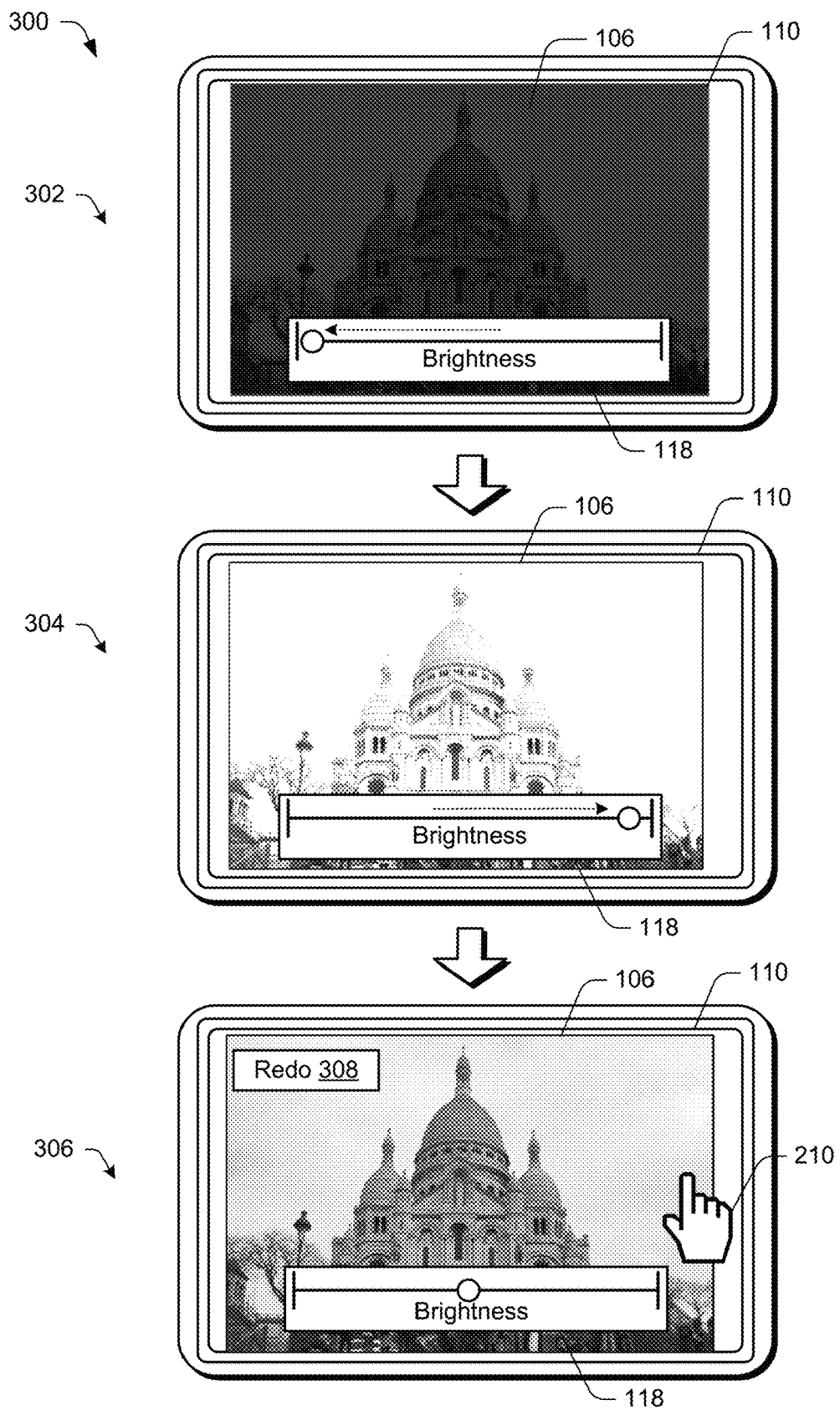
FIG. 3 depicts an example implementation of animating a control to set a display characteristic.
Figure 4:
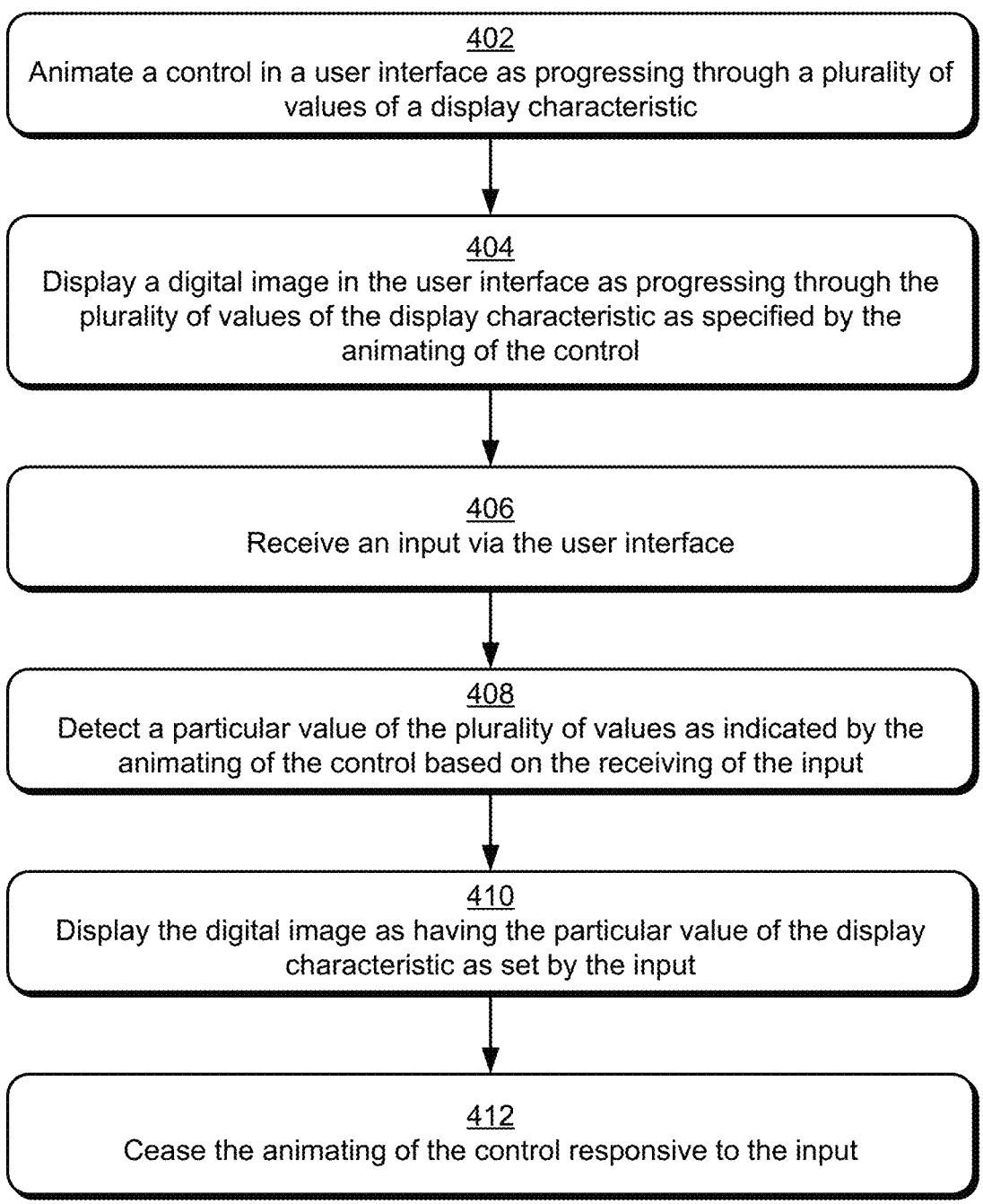
FIG. 4 depicts a procedure in an example implementation of animated display characteristic control for a digital image.

FIG. 2 depicts a system 200 in an example implementation showing operation of a display characteristic editing system of FIG. 1 in greater detail as animating a control to set a value of a display characteristic. FIG. 3 depicts an example implementation 300 of animating a control to set a display characteristic. FIG. 4 depicts a procedure 400 in an example implementation of animated display characteristic control for a digital image.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference to FIGS. 2 and 3 is made in parallel with the procedure 400 of FIG. 4.

To begin in the example system 200 of FIG. 2, a digital image 106 is received by the display characteristic editing system 116. An animation module 202 is employed to animate a control 118 in a user interface 110 as progressing through a plurality of values of a display characteristic (block 402). To do so, the animation module 202 leverages a value iteration module 216 to progress through the plurality of values for the display characteristic in order and generate a representation of this as an animated control 206.

The animation module 202, for instance, receives an indication of a display characteristic, values supported by the display characteristic, and a corresponding control to be used to control the display characteristic in the user interface 110. The animation module 202, when appropriate, normalizes values of the display characteristic to correspond with values supported by the control. The value iteration module 204 then selects from the values, sequentially, e.g., as part of a "back-and-forth" process between minimum and maximum values for the display characteristic. These values, as output by the value iteration module 204, are used to configure the animation to indicate the value, e.g., as a relative value by a position of a slider control, dial, and so forth.

This value is also used to set the display characteristic for the digital image 106 as displayed in the user interface 110. As a result, display of the control 118 indicates a "current" value and display of the digital image 106 indicates an effect of that value in real time as changes are made to the value. In this way, display of the digital image 106 in the user interface 110 progresses through the plurality of values of the display characteristic as specified by the animating of the control 118 (block 404) by the animation module 202. Thus, the animation of the control 118 is usable to indicate both a value of a display characteristic and an effect of that value on the display characteristic as applied to digital image automatically and without user intervention.

A user interface module 208 is employed to output the user interface 110. A user input 210 is received via the user interface (block 406). FIG. 3 depicts an example implementation 300 of animating a control to set a display characteristic, which is illustrated using a first stage 302, a second stage 304, and a third stage 306. A digital image 106 is displayed in a user interface 110. A control 118 is animated from a minimum value at the first stage 302 to a maximum value at the second stage 304 for brightness. As part of this, the effect of the values on the display characteristic as applied to the digital image 106 is displayed in the user interface 110. This process continues in a back-and-forth manner to iterate through the values in sequence, automatically and without user intervention, through use of the animation.

At the third stage 306, a user input 210 is received to set the value of the display characteristic at a current value specified by the control 118. In the illustrated example, the user input 210 is a tap gesture detected at a location in the user interface 110 outside a display of the control 118. Other examples are also contemplated, such as keyboard inputs, voice commands, and so forth. In response, this value is set for the digital image 106. A "redo" option 308 is also output in the user interface 110 to begin the process again, e.g., to select a different value for the display characteristic.

A value detection module 212 detects a particular value 214 as indicated by the animating of the control 118 based on the received user input 210 (block 408). The value detection module 212, for instance, detects the 214 as corresponding to which of the plurality of values are output by the animated control 206 at a time, at which, the user input 210 is received. The digital image 106 is displayed as having as having the particular value of the display characteristic as set by the user input 210 (block 410) as shown at the third stage 306 of FIG. 3. Additionally, the animating of the control 118 ceases responsive to the input (block 412). The digital image 106 thus has this value set, e.g., stored as part of the digital image 106 in the storage device 108. In an implementation, this process iterates through a plurality of display characteristics, thereby supporting efficient digital image editing techniques. These techniques are also usable in a variety of other scenarios, an example of which is described in the following section and shown in corresponding figures.

Display Characteristic Control Training

Figure 5:
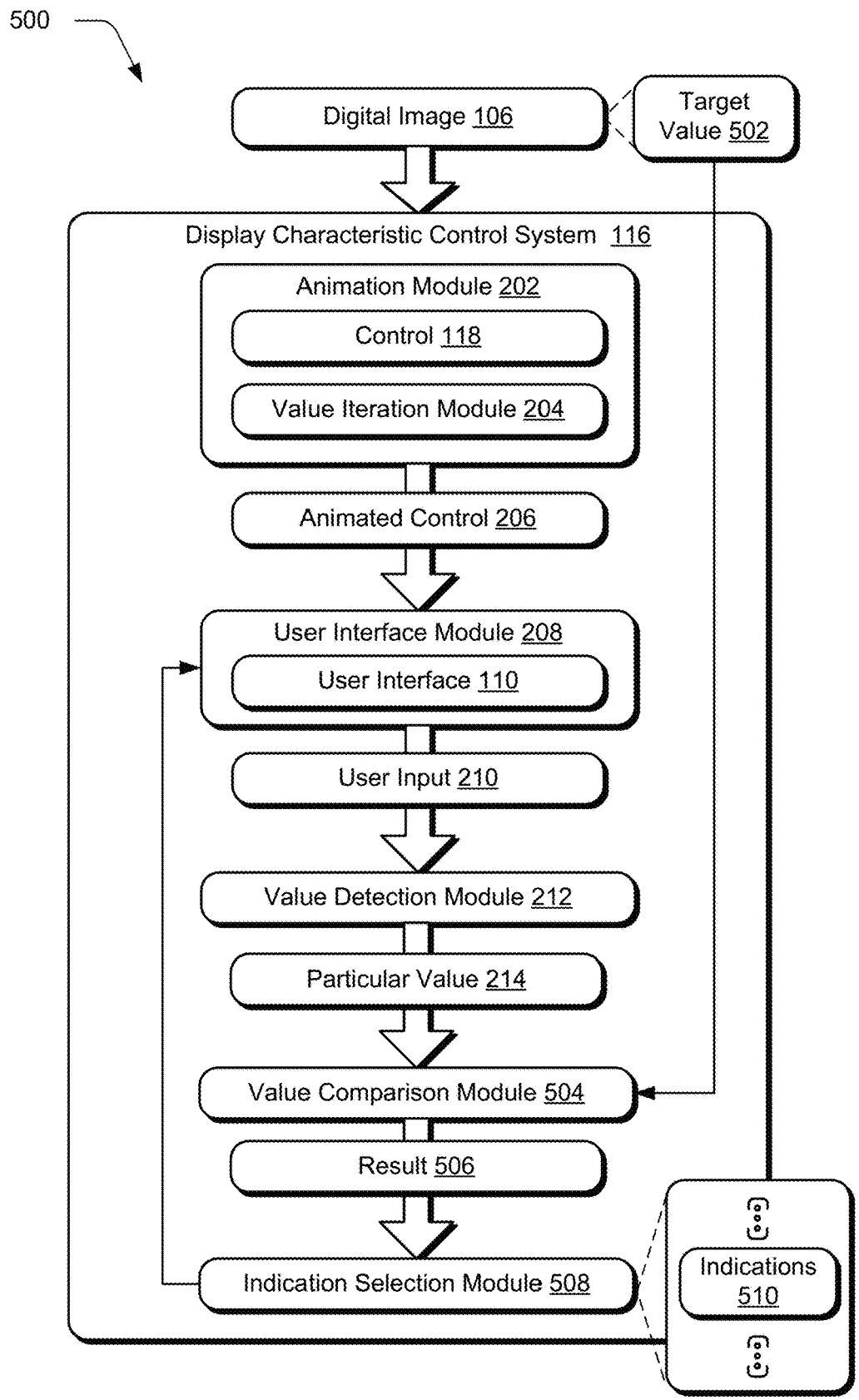
FIG. 5 depicts a system in an example implementation showing operation of a display characteristic editing system of FIG. 1 in greater detail as animating a control as part of user training.
Figure 6:
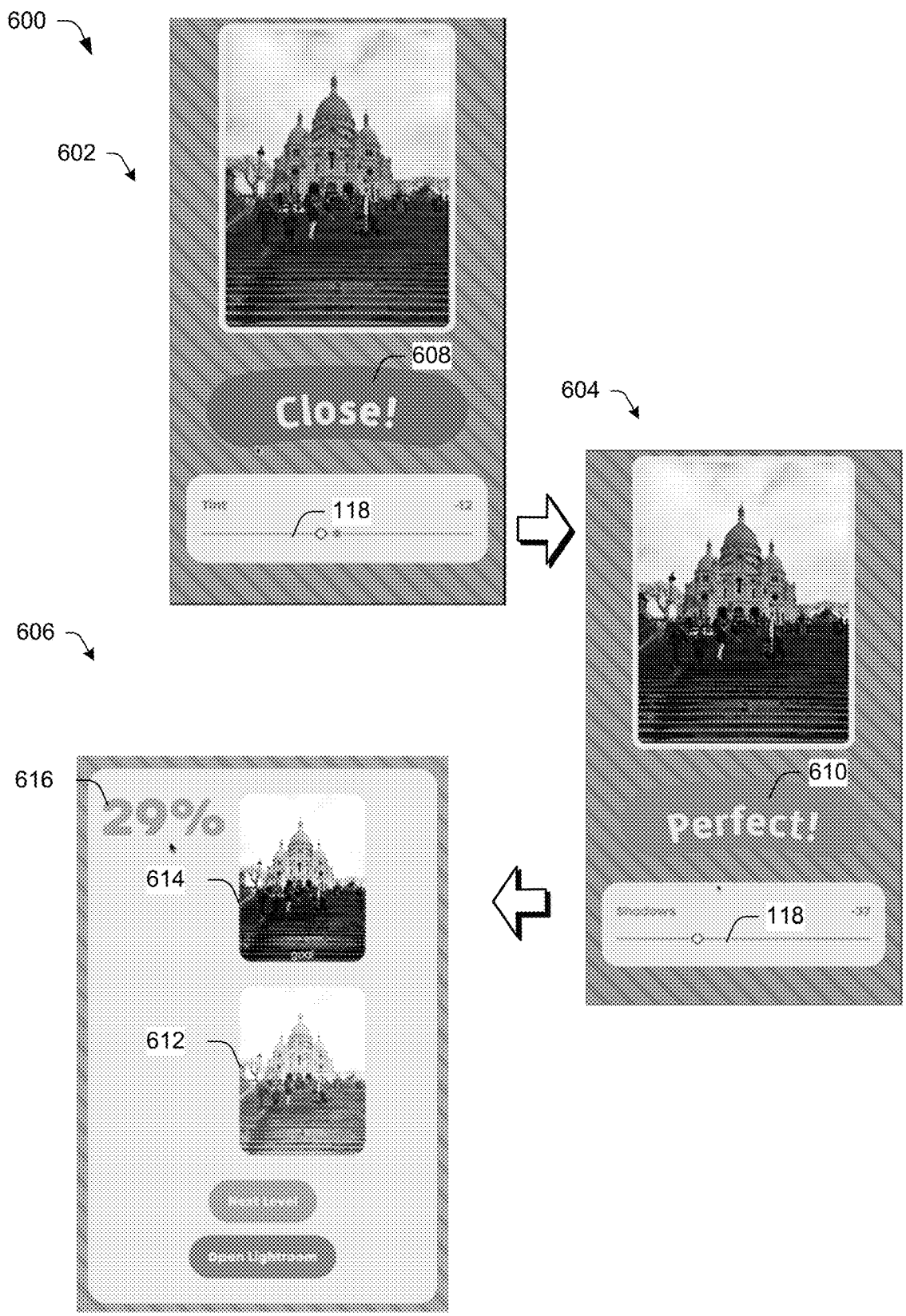
FIG. 6 depicts an example implementation of animating a control and outputting indications usable to train user interaction with a display characteristic editing system of FIG. 1.
Figure 7:
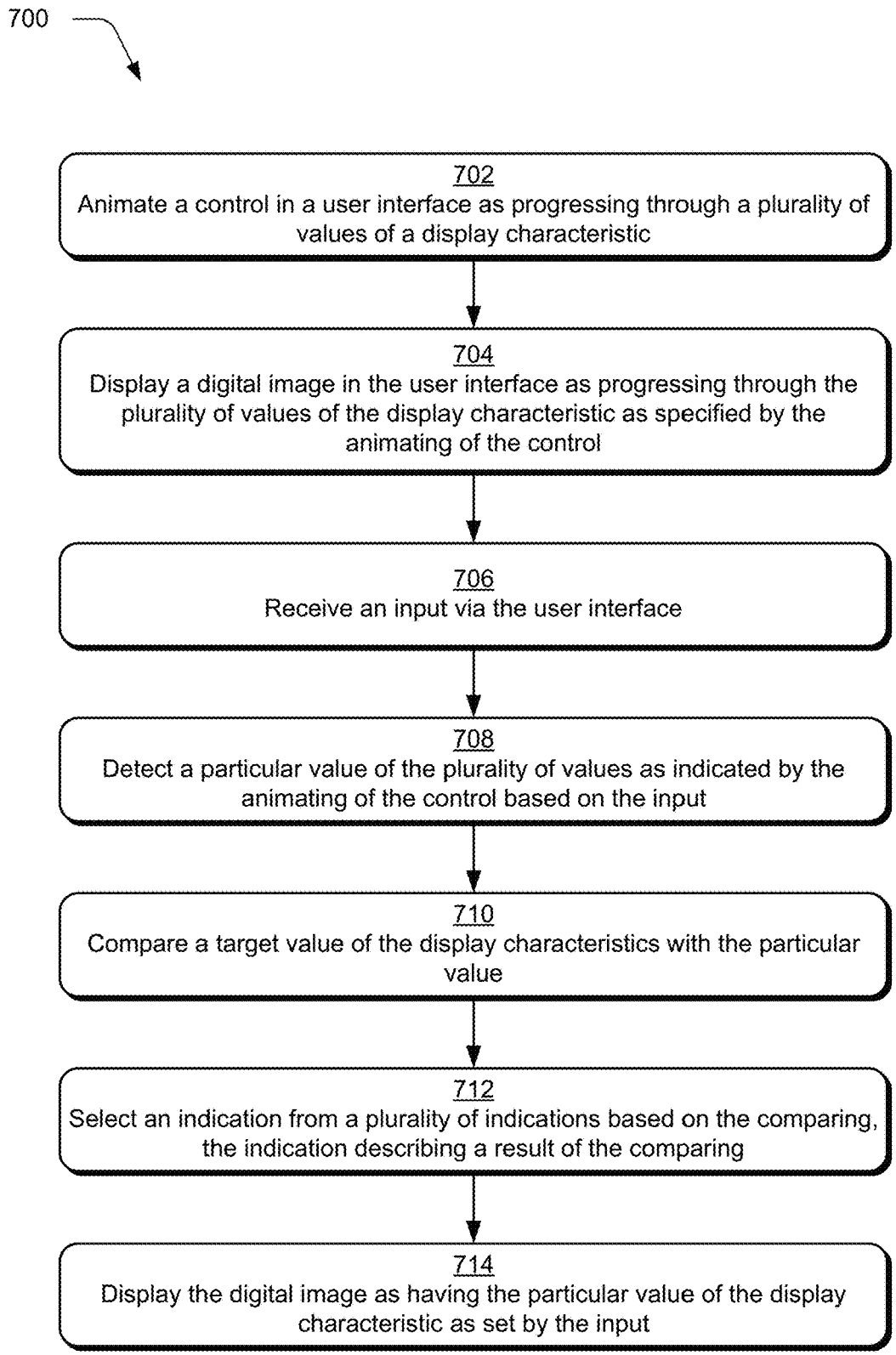
FIG. 7 depicts a procedure in an example implementation of digital image edit training using an animated display characteristic control.

FIG. 5 depicts a system 500 in an example implementation showing operation of a display characteristic editing system of FIG. 1 in greater detail as animating a control as part of user training. FIG. 6 depicts an example implementation 600 of animating a control and outputting indications usable to train user interaction with the display characteristic editing system 116. FIG. 7 depicts a procedure 700 in an example implementation of digital image edit training using an animated display characteristic control.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference to FIGS. 5 and 6 is made in parallel with the procedure 700 of FIG. 7.

In the previous example, animation of the control is used to set a display characteristic as part of iterating through a plurality of display characteristics efficiently to edit the digital image. In this example, these techniques are gamified to support user training in operation of the image processing system 104. This increases efficiency in training casual and even professional users to recognize and improve use of digital characteristics in digital image editing.

Gamification achieved through leveraging animation of the control 118 supports training techniques to learn usage of display characteristics to achieve visually correct results. To do so, the display characteristic editing system 116 is configurable to receive an edited digital image and extract data describing edits made to the digital image, e.g., extendible metadata platform (XMP) data. Raw image data from the digital image 106 is then used to display an unedited version of the digital image 106 in the user interface 110. An edited version of the digital image 106 is also displayable, e.g., by showing half of an unedited version and half of the edited version in the user interface 110. The control 118 is animated as before, and a user is tasked with providing inputs such that display characteristics achieve a visual appearance of the edited version. Notifications are output to provide feedback, which is usable to iterate through a plurality of display characteristics to receive a final score.

In the example system 500 shown in FIG. 5, a digital image 106 is received by the display characteristic editing system 116. The digital image 106 includes a raw image data and extendible metadata platform (XMP) data describing edits made to the digital image. In this example, the XMP data is used to describe target values 502 of display characteristics made to edit the digital image 106.

The animation module 202 is employed as before to animate a control 118 in a user interface 110 as progressing through a plurality of values of a display characteristic (block 702). The value iteration module 216 progresses through the plurality of values for the display characteristic in order and generates a representation of this as an animated control 206, e.g., a slide, a dial and so forth.

This value is also used to set the display characteristic for the digital image 106 as displayed in the user interface 110. As a result, display of the control 118 indicates a "current" value and display of the digital image 106 indicates an effect of that value in real time as changes are made to the value. Display of the digital image 106 in the user interface 110 also progresses through the plurality of values of the display characteristic as specified by the animating of the control 118 (block 704) by the animation module 202. Thus, the animation of the control 118 is usable to indicate both a value of a display characteristic and an effect of that value on the display characteristic as applied to digital image automatically and without user intervention.

A user input 210 is received via a user interface 110 (block 706) output by the user interface module 208 and a particular value 214 is detected by the value detection module 212 of the plurality of values as indicated by the animating of the control based on receipt of the input (block 708). In this example, however, a value comparison module 504 is employed to compare the particular value 214 with a target value 502 of the display characteristic (block 710) taken from the digital image 106. This is used, for instance, to determine "how close" the particular value 214 is to the target value 502. A result 506 of this comparison is output to an indication selection module 508.

The indication selection module 508 is representative of functionality to select an indication from a plurality of indications 510 based on a result 506 of the comparison (block 712) and in an implementation describes this result, e.g., "how close" the particular value is to the target value 502. The digital image is then displayed in the user interface 110 as having the particular value of the display characteristic as set by the input (block 714).

FIG. 6 depicts an example implementation 600 of animating a control and outputting indications usable to train user interaction with the display characteristic editing system 116. This implementation is illustrated using first, second, and third stages 602 604, 606. At the first stage 602, a user input is received via interaction with the control 118, and an indication 608 of "close" is selected based on a threshold distance defined for that indication for a display characteristic of "tint." This process continues at a second stage 604 in which a "perfect" indication 610 is output indicating the particular value 214 of the input matches the target value 502 for a "shadows" display characteristic. At the third stage 606, the digital image 612 as modified by the user is displayed along with the digital image 614 as received as a "target" for the processing, along with an overall score 616. In this way, animated display characteristic control supports improved training and user interaction with the image processing system 104.

Example System and Device

Figure 8:
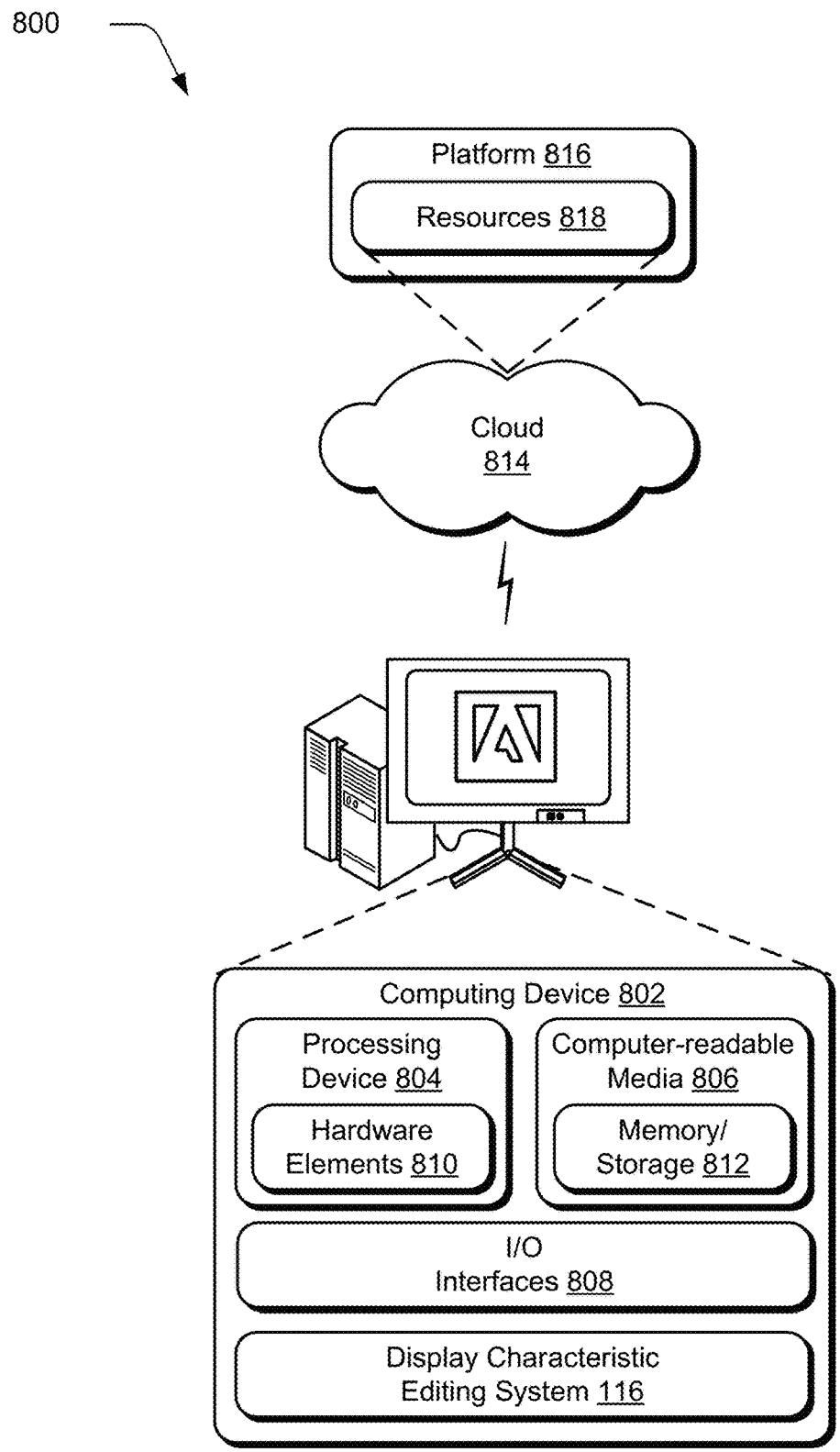
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that implement the various techniques described herein. This is illustrated through inclusion of the display characteristic editing system 116. The computing device 802 is configurable, for example, as a server of a service provider, a device associated with a client (e.g., a client device), an on-chip system, and/or any other suitable computing device or computing system.

The example computing device 802 as illustrated includes a processing device 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 804 is representative of functionality to perform one or more operations using hardware. Accordingly, the processing device 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812 that stores instructions that are executable to cause the processing device 804 to perform operations. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing device 804. The instructions and/or functions are executable/operable by one or more articles of manufacture (for example, one or more computing devices 802 and/or processing devices 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

In implementations, the platform 816 employs a "machine-learning model" that is configured to implement the techniques described herein. A machine-learning model refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    animating, by a processing device, a control in a user interface as progressing through a plurality of values of a display characteristic;
    displaying, by the processing device, a digital image in the user interface as progressing through the plurality of values of the display characteristic as specified by the animating of the control;
    receiving, by the processing device, an input via the user interface;
    detecting, by the processing device, a particular value of the plurality of values as indicated by the animating of the control based on the receiving of the input; and
    displaying, by the processing device, the digital image as having the particular value of the display characteristic as set by the input.

2. The method as described in claim 1, wherein the animating of the control includes progressing back-and-forth between a minimum value and a maximum value of the plurality of values of the display characteristic.

3. The method as described in claim 1, wherein the displaying the digital image as progressing through the plurality causes a corresponding animation of a visual appearance of the digital image as having a respective value of the plurality of values as indicated by the animating of the control.

4. The method as described in claim 1, wherein the receiving the input via the user interface is performed using a gesture.

5. The method as described in claim 4, wherein the gesture is a tap gesture detected at a location in the user interface outside a display of the control.

6. The method as described in claim 1, further comprising ceasing the animating of the control responsive to the receiving of the input.

7. The method as described in claim 1, wherein the control is configured to support user interaction, directly with the control through the user interface, to set one of the plurality of values.

8. The method as described in claim 1, wherein the control is a slider control or a dial control displayable in the user interface.

9. A method comprising:
    animating, by a processing device, a control in a user interface as progressing through a plurality of values of a display characteristic;
    displaying, by the processing device, a digital image in the user interface as progressing through the plurality of values of the display characteristic as specified by the animating of the control;
    receiving, by the processing device, an input via the user interface;
    detecting, by the processing device, a particular value of the plurality of values as indicated by the animating of the control based on the input;
    comparing, by the processing device, a target value of the display characteristics with the particular value;
    selecting, by the processing device, an indication from a plurality of indications based on the comparing, the indication describing a result of the comparing; and
    displaying, by the processing device, the indication and the digital image in the user interface.

10. The method as described in claim 9, wherein the animating of the control includes progressing back-and-forth between a minimum value and a maximum value of the plurality of values of the display characteristic.

11. The method as described in claim 9, wherein the displaying the digital image as progressing through the plurality causes a corresponding animation of a visual appearance of the digital image as having a respective value of the plurality of values as indicated by the animating of the control.

12. The method as described in claim 9, wherein the receiving the input via the user interface is performed using a gesture.

13. The method as described in claim 9, further comprising ceasing the animating of the control responsive to the receiving of the input.

14. The method as described in claim 9, wherein the control is configured to support user interaction, directly with the control through the user interface, to set one of the plurality of values.

15. The method as described in claim 9, wherein the control is a slider control or a dial control displayable in the user interface.

16. A system comprising:
    an animation module implemented by a processing device to animate a control in a user interface as progressing through a plurality of values of a display characteristic;
    a user interface module implemented by the processing device to display a digital image in a user interface as progressing through the plurality of values of the display characteristic as specified by the animating of the control and receive an input via the user interface; and
    a value detection module implemented by the processing device to detect a particular value of the plurality of values based on the input, set the particular value for the display characteristic for displaying the digital image, and ceasing animation of the control.

17. The system as described in claim 16, wherein animation of the control includes progressing back-and-forth between a minimum value and a maximum value of the plurality of values of the display characteristic.

18. The system as described in claim 16, wherein display of the digital image by the user interface module as progressing through the plurality of values causes a corresponding animation of a visual appearance of the digital image as having a respective value of the plurality of values.

19. The system as described in claim 16, wherein the input is performed using a gesture.

20. The system as described in claim 16, wherein the control is a slider control or a dial control displayable in the user interface.

* * * * *